Patented Aug. 10, 1948

2,446,889

UNITED STATES PATENT OFFICE 2,446,889

CANNED FISH OF IMPROVED PALATABILITY AND PROCESS OF PREPARING SAME

Loren B. Sjöström, Wakefield, Mass., assignor to Arthur D. Little, Inc., Cambridge, Mass., a corporation of Massachusetts No Drawing. Application August 29, 1945, Serial No. 613,425

10 Claims. (Cl. 99—188)

This invention relates to the treatment of edible fish to improve their palatability and is concerned particularly with a treatment of fish, which are to be subjected to sterilization heat after packaging in sealed containers, to prevent the development of disagreeable flavor during the sterilization process.

The invention has been found to be particularly valuable in the treatment of the young of herring (Clupea harengus) in their preparation for consumption as sardines. The young of this fish, found in quantity off Maine shores, if eaten immediately after suitable cooking, has a mild agreeable fish flavor indicating its use as a substitute for varieties of European fish, including the young of the pilchard (Clupea pilchardus), heretofore widely used in the sardine trade.

Experience has shown, however, that cooked herring, unlike cooked European pilchard, develop an unpleasant flavor when they are subjected in sealed containers to commercial sterilization processing; they taste quite differently after the processing, being astringent, flat and earthy with little resemblance in flavor to the canned, sterilized European pilchard; they leave a lingering poor after-taste in the mouth and are the cause of gastric disturbances.

It is a primary object of the invention therefore to provide a treatment for cooked fish which develop unpleasant flavor during sterilization in sealed containers, specifically Maine herring, to preserve during sterilization desirable qualities of their flavor as it exists immediately after cooking. It is a further object of the invention to provide a treatment for cooked fish, specifically Maine herring, which will improve their digestibility after sterilization in sealed containers.

A usual processing operation for Maine herring is described by M. E. Highlands and O. B. Williams at page 34 of Food Research, volume IX, No. 1, 1944. Usual processing includes brining of the fish, loading the fish on racks or flakes, cooking of the fish either by steaming, frying or baking, cooling the fish, cutting and trimming the fish for packing, packing the fish in cans, adding an oil, usually a vegetable oil, such as cottonseed oil, with or without flavoring agents, or a sauce, such as mustard or tomato sauce, sealing the cans and then processing at sterilization temperatures.

This type of processing, in the case of herring, produces fish having the undesirable flavor heretofore described.

In accordance with this invention the flavor of the fish is remarkably improved by treating the fish, after cooking and preferably after cooling but before sealing in packaging containers, with an alkali. The treatment may take any of several forms. The alkali may be sprayed in dilute solution on the fish; the fish may be dipped into a dilute alkali solution; or an alkali may be added directly to the fish in the packaging container either before, with, or after the oil or other packaging liquid. The addition type of procedure tends to be spotty in effect and therefore spraying or dipping are preferred procedures.

The following examples show typical treatments of fish by the three methods:

Example I

Young of herring were brined four hours in a 5% salt solution, cleaned, rinsed, in cool water and dried at room temperature. The fish were cooked by baking 23 minutes at 300° F. and cooled on trays for about two hours. A 2% aqueous solution of sodium carbonate was then sprayed directly on the fish for 2 minutes through a spray head which acted to distribute the solution over the fish. The fish were drained and then 150 grams of fish were placed in a container with 50 ml. of cottonseed oil. The container was sealed, placed in a pressure cooker and subjected to a temperature of 250° F. for 30 minutes.

This treatment produced excellent tasting fish. Good results were obtained on fish treated in the same manner, but with a 50 second instead of a 2 minute spray. By increasing the concentration of the sodium carbonate to 5%, a spray of 15 seconds duration produced the desired improved flavor.

In spraying, the spray may be directed on both sides of the fish, but we have not found this to be essential.

Example II

Young of herring were brined for four hours in a 5% salt solution, cleaned, rinsed in cool water and dried at room temperature. The fish were baked at a temperature of 300° F. for 20 minutes and cooled on trays as in Example I. The fish were then immersed in a 2% aqueous sodium carbonate solution for one minute, drained and 150 grams of fish were packaged with 50 ml. of cottonseed oil, sealed and processed for 30 minutes at 250° F.

This treatment produced excellent tasting fish. Reduction of the sodium carbonate concentration to 1% and increased to 4% also produced good results with a one minute dip.

In contrast, young of herring treated with alkali prior to cooking, then cooked, then processed, developed the astringent, flat, earthy taste of fish cooked and processed without any alkali treatment.

*Example III*

Young of herring were brined for four hours in a 5% salt solution, cleaned, rinsed in cool water and dried at room temperature. The fish were baked at 300° F. for 20 minutes and cooled on trays as in Example I. They were then trimmed and 150 grams of fish were packed in a container for sterilization, there being added 50 ml. of cottonseed oil, and a mixture of 2 ml. of water and 0.20 gram of sodium carbonate. The container was then sealed and autoclaved at 250° F. for 30 minutes.

This treatment produced fish with sweet, mild taste.

The same procedure was followed utilizing lesser amounts of sodium carbonate, namely 0.05 gram and 0.10 gram. Improved flavor resulted, but somewhat inferior to that of the 0.20 gram treatment.

Addition of disodium phosphate and trisodium phosphate in amounts of 0.10 gram to 0.40 gram and of 0.03 gram to 0.10 gram, respectively, in accordance with the above procedure also produced improved flavor.

In accordance with my theory, the alkali treatment should be regulated in accordance with the surface area of the fish being treated; its primary purpose is to act upon materials, present at the surface of the fish, which materials, during processing, tend to change the flavor of the fish in the absence of the alkali treatment.

Sodium carbonate has been found to be very satisfactory for use in the treatment of fish in accordance with this process, though other non-toxic alkalis may be used, such as sodium bicarbonate, and disodium and trisodium phosphate. In the case of immersion, the optimum concentration of the alkali is dependent upon the time of treatment. Solutions weaker than 2% require a longer time of treatment. In the case of spraying, a 2-5% solution of sodium carbonate has been found satisfactory but weaker or stronger solutions may be utilized depending upon the time of treatment. Where weaker alkalis are used, the concentration must be greater for equal periods of treatment. In general, concentrations of alkali from 1-10% are useful, depending upon the time of treatment.

While the alkali treatment changes the surface and interior pH of the fish, the change is small. For example, in the case of immersion treatments with 2 and 3% alkali solutions, average determinations of surface pH's of canned whole fish and pH's of the canned fish after maceration showed an increase from about 6.41 in the case of fish not treated with alkali in accordance with this invention, to from 6.51 to 6.67 in the case of fish alkali-treated after cooking, although the change in individual fish ran as high as .5 of a pH unit. Likewise in the addition treatments of Example III, surface pH of about 6.6 in the cooked untreated fish was in no case raised above 6.91 by the alkali treatment.

While the cooking of the above fish was by baking, the alkali treatment after cooking produces similar beneficial results in the case of fish cooked by steaming or by frying. It is contemplated that flavoring agents or sauces may be packaged with the treated fish.

I claim:

1. In the preparation of cooked fish packaged in sterilized containers wherein the fish normally develop undesirable flavor during sterilization, the method of improving the flavor of the sterilized fish comprising treating the fish after cooking but before sterilization with a non-toxic edible alkali.

2. In the preparation of cooked fish packaged in sterilized containers wherein the fish normally develop undesirable flavor during sterilization, the method of improving the flavor of the sterilized fish comprising treating the fish after cooking but before sterilization with a dilute solution of a non-toxic edible alkali.

3. In the preparation of cooked fish packaged in sterilized containers wherein the fish normally develop undesirable flavor during sterilization, the method of improving the flavor of the sterilized fish comprising treating the fish after cooking but before sterilization with sodium carbonate.

4. In the preparation of cooked fish packaged in sterilized containers wherein the fish normally develop undesirable flavor during sterilization, the method of improving the flavor of the sterilized fish comprising treating the fish after cooking but before sterilization with disodium phosphate.

5. In the preparation of cooked young of herring packaged as sardines in sealed sterilized containers, the method of improving the flavor of the sterilized herring comprising cooking the herring, treating the herring after cooking with a 1 to 10% solution of a non-toxic edible alkali, packaging the cooked alkali-treated herring in containers, sealing the containers and sterilizing the sealed containers and contained cooked alkali-treated herring.

6. In the preparation of cooked fish packaged in sterilized containers wherein the fish normally develop undesirable flavor during sterilization, the method of improving the flavor of the sterilized fish comprising spraying the fish after cooking but before sterilization with an alkali solution.

7. In the preparation of cooked fish packaged in sterilized containers wherein the fish normally develop undesirable flavor during sterilization, the method of improving the flavor of the sterilized fish comprising immersing the fish after cooking but before sterilization in a dilute alkali solution.

8. In the preparation of cooked fish packaged in sterilized containers wherein the fish normally develop undesirable flavor during sterilization, the method of improving the flavor of the sterilized fish comprising cooking the fish, packaging the cooked fish in containers with an added non-toxic edible alkali, sealing the containers and then sterilizing the sealed containers and contained cooked fish.

9. In the preparation of cooked fish packaged as sardines in sterilized containers wherein the fish normally develop undesirable flavor during sterilization, the method of improving the flavor of the sterilized sardines comprising cooking the fish, treating the fish after cooking with a dilute solution of a non-toxic edible alkali, draining the alkali-treated fish to remove excess alkali solution, and thereafter packaging the drained fish in containers, sealing the containers and sterilizing the sealed containers and contained cooked alkali-treated fish.

10. In the preparation of cooked young of herring packaged as sardines in sealed sterilized containers, the method of improving the flavor of the sardines comprising cooking the herring, spraying the herring after cooking with a sodium carbonate solution having a concentration from 2 to 5%, draining the sprayed herring to remove excess alkali solution and thereafter packaging the drained herring in containers, sealing the containers and sterilizing the sealed containers and contained cooked alkali-treated herring.

LOREN B. SJÖSTRÖM.

REFERENCES CITED

The following references are of record in the file of this patent:

UNITED STATES PATENTS

| Number | Name | Date |
|---|---|---|
| 172,196 | Stevens | Jan. 11, 1876 |
| 1,016,046 | Taylor | Jan. 30, 1912 |
| 2,064,872 | Ash et al. | Dec. 22, 1936 |
| 2,294,428 | Stockhamer | Sept. 1, 1942 |

FOREIGN PATENTS

| Number | Country | Date |
|---|---|---|
| 12,686 | Great Britain | May 18, 1901 |